(12) United States Patent
Pisani et al.

(10) Patent No.: US 11,851,171 B2
(45) Date of Patent: Dec. 26, 2023

(54) HEAT EXCHANGER FOR AN AIRCRAFT

(71) Applicant: LEONARDO S.P.A., Rome (IT)

(72) Inventors: Paolo Pisani, Samarate (IT); Federico Montagna, Samarate (IT); Stefano Poggi, Samarate (IT)

(73) Assignee: LEONARDO S.P.A., Rome (IT)

( * ) Notice: Subject to any disclaimer, the term of this patent is extended or adjusted under 35 U.S.C. 154(b) by 96 days.

(21) Appl. No.: 17/264,180

(22) PCT Filed: Jul. 26, 2019

(86) PCT No.: PCT/IB2019/056411
§ 371 (c)(1),
(2) Date: Jan. 28, 2021

(87) PCT Pub. No.: WO2020/031013
PCT Pub. Date: Feb. 13, 2020

(65) Prior Publication Data
US 2021/0163124 A1 Jun. 3, 2021

(30) Foreign Application Priority Data

Aug. 6, 2018 (EP) .................................... 18187435

(51) Int. Cl.
*B64C 27/04* (2006.01)
*F02C 7/14* (2006.01)
(Continued)

(52) U.S. Cl.
CPC ................ *B64C 27/04* (2013.01); *F02C 7/14* (2013.01); *F28D 9/0068* (2013.01);
(Continued)

(58) Field of Classification Search
CPC .... F28F 3/00; F28F 13/08; F28F 13/12; F28F 3/02; F28D 9/0068; F28D 2021/0021;
(Continued)

(56) References Cited

U.S. PATENT DOCUMENTS

2006/0245987 A1 * 11/2006 Schmidt ............... B01J 19/0093
422/198
2008/0314569 A1 * 12/2008 Yamazaki .......... F02M 37/0029
123/568.12
(Continued)

FOREIGN PATENT DOCUMENTS

DE          3300929 A1 *  7/1984
EP          2712805       4/2014
(Continued)

OTHER PUBLICATIONS

DE3300929A1 mt (Year: 1984).*

*Primary Examiner* — Gordon A Jones
(74) *Attorney, Agent, or Firm* — Leason Ellis LLP (57) ABSTRACT

A heat exchanger for a transmission unit of an aircraft is described that comprises: a first module defining a first feed path for a first fluid to be cooled; a second module defining a second feed path for a second cooling fluid; the first and second feed paths being thermally coupled to each other; each second module comprising: at least one cell formed by an inlet for a second cooling fluid; an outlet for the second cooling fluid, which is arrange on the opposite side to the inlet along a first direction; a first wall thermally coupled to the first path; a pair of second walls; and a plurality of fins projecting in a cantilever fashion from the first wall. The heat exchanger further comprises at least a first row of fins, which lie on a plane orthogonal to the first direction, the fins of the first row extending at progressively increasing distances from one of the second walls along a second direction orthogonal to the first direction.

13 Claims, 5 Drawing Sheets

(51) Int. Cl.
*F28D 9/00* (2006.01)
*F28D 21/00* (2006.01)

(52) U.S. Cl.
CPC ............ *F28D 2021/0021* (2013.01); *F28D 2021/0049* (2013.01); *F28D 2021/0089* (2013.01)

(58) Field of Classification Search
CPC ..... F28D 2021/0049; F28D 2021/0089; B64C 27/04; F02C 7/14; H05K 7/2039
See application file for complete search history.

(56) References Cited

U.S. PATENT DOCUMENTS

| | | | | |
|---|---|---|---|---|
| 2009/0145581 A1* | 6/2009 | Hoffman | ............... | F28F 3/14 165/80.3 |
| 2013/0223012 A1* | 8/2013 | Pierides | ............ | H05K 7/20409 165/185 |
| 2014/0014308 A1* | 1/2014 | Wu | ................ | H05K 7/20409 165/185 |
| 2015/0027662 A1* | 1/2015 | Schmitz | ............. | F28D 20/02 165/67 |
| 2016/0115864 A1* | 4/2016 | Campbell | ............ | F28F 3/048 29/888.012 |
| 2016/0131432 A1 | 5/2016 | Neumann et al. | | |
| 2017/0241721 A1* | 8/2017 | Liang | ................. | F28F 3/048 |

FOREIGN PATENT DOCUMENTS

| | | | | |
|---|---|---|---|---|
| FR | 2905673 A1 * | 3/2008 | ............. | B64C 27/14 |
| FR | 2988822 | 10/2013 | | |
| GB | 1071682 A1 * | 4/1964 | | |
| GB | 2 496 692 | 5/2013 | | |
| JP | S61 41896 | 2/1986 | | |
| WO | WO-2004033978 A1 * | 4/2004 | ............. | B23P 15/26 |
| WO | WO 2014/018198 | 1/2014 | | |
| WO | WO 2016/018498 | 2/2016 | | |

* cited by examiner

HEAT EXCHANGER FOR AN AIRCRAFT

CROSS-REFERENCE TO RELATED APPLICATIONS

This Patent application is a U.S. National Phase Application under 35 U.S.C. § 371 of International Patent Application No. PCT/IB2019/056411, filed on Jul. 26, 2019, which claims priority from European Patent Application No. 18187435.5, filed on Aug. 6, 2018, all of which are incorporated by reference, as if expressly set forth in their respective entireties herein.

TECHNICAL FIELD

The present invention relates to a heat exchanger for an aircraft, in particular a helicopter.

More specifically, the exchanger is a liquid-gas heat exchanger, an oil-air one in the case shown.

BACKGROUND ART

As is known, helicopters are normally equipped with a plurality of transmission units that are adapted to transmit drive from one or more turbines to the main and/or tail rotors, and/or from the turbine to a plurality of accessory devices, i.e. assigned, for example, to provide the power necessary for operation of the flight instruments.

In a known manner, a lubricating fluid, typically oil, circulates inside the transmission unit, both for lubricating the moving parts of the transmission unit and for cooling said moving parts.

In order to ensure the effectiveness of lubrication and cooling, it is necessary to cool the lubricating fluid circulating inside the transmission units.

To this end, helicopters are fitted with cooling systems that basically comprise:
- a heat exchanger to exchange heat between the oil of the transmission unit and air circulating inside the cooling system; and
- a fan adapted to create air circulation from the heat exchanger to the fan.

In known solutions, the heat exchanger comprises:
- an oil conveying circuit running from a first inlet station to a first outlet station; and
- an air conveying circuit running from a second inlet station to a second outlet station.

In particular, the oil has a first temperature value at the first inlet station and a second temperature value, lower than the first temperature value, at the first outlet station.

Contrariwise, the air has a third temperature value at the second inlet station and a fourth temperature value, higher than the first temperature value, at the second outlet station.

In other words, the oil yields heat to the air, cooling itself inside the heat exchanger while the air simultaneously heats up.

Known types of heat exchanger also comprise a plurality of modules, each formed by:
- a wall lapped by the oil and by the air on respective mutually opposite faces;
- a plurality of first fins facing the inside of the oil conveying circuit and projecting in a cantilever fashion from the first face; and
- a plurality of second fins facing the inside of the air conveying circuit and projecting in a cantilever fashion from the second face.

In particular, the second fins extend orthogonally to the wall and have a certain length along a first direction running from the second inlet station to the second outlet station.

The second fins are also arranged so as to form a plurality of consecutive rows, proceeding along a first direction.

The second fins of mutually immediately consecutive rows are staggered, along a second direction orthogonal to the first direction.

In particular, the fins of each row are arranged on a median section of the immediately consecutive row.

Due to the aforesaid configuration, the air is partially heated at the end of each row, reducing the residual heat exchange capacity of the air.

More specifically, the peripheral regions of the portion of air flow that lap the second fins heat up through thermal conduction while the central region of this portion heats up when it laps the second fins of the next row.

This partial heating is repeated at the end of each row, until a condition is attained in which the air substantially reaches the same temperature of the rows of second fins it strikes against. In this condition, there is essentially no heat exchange between the air and the second fins and, therefore, there is no cooling of the oil.

There is thus awareness in the industry of the need to optimize the heat exchange between air and oil, for the same heat exchanger weight and pressure drop between the second inlet section and the second outlet section.

Furthermore, known types of heat exchangers are made through brazing, i.e. by welding various parts together.

The use of this technology defines a constraint with respect to shapes and configurations achievable for the first and second fins.

There is also awareness in the industry of the need to provide a heat exchanger that is particularly flexible with regard to the shape and arrangement of the first fins and the second fins.

US 2016/0115864, EP-B-2712805, FR-A-2988822 and WO2016/018498 describe heat exchangers for known types of aircraft.

GB-A-2496692 discloses a heat exchanger according.

DISCLOSURE OF INVENTION

The object of the present invention is to provide a heat exchanger for an aircraft that satisfies at least one of the above-specified needs in a simple and inexpensive manner.

The aforesaid object is achieved by the present invention, in so far as it relates to a heat exchanger for a transmission unit of an aircraft.

BRIEF DESCRIPTION OF THE DRAWINGS

For a better understanding of the present invention, a preferred embodiment is described hereinafter, purely by way of non-limitative example and with reference to the accompanying drawings, in which.

Figure 1:
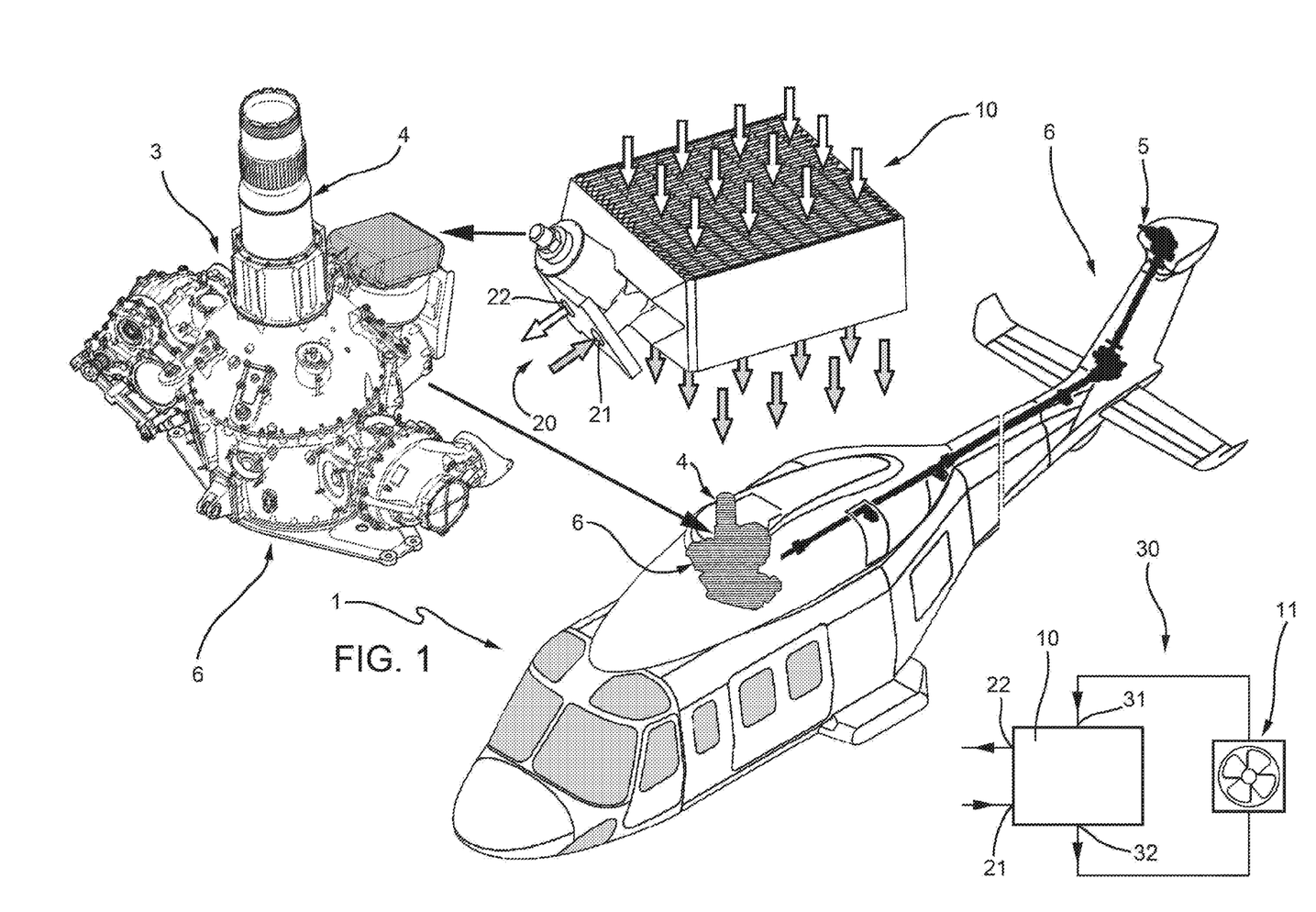
FIG. 1 is a partially exploded perspective view of a helicopter comprising a heat exchanger made according to the teachings of the present invention.

Referring to FIG. 1, reference numeral 1 indicates a helicopter comprising a pair of turbines, a main rotor and a tail rotor (not fully shown).

BEST MODE FOR CARRYING OUT THE INVENTION

The helicopter 1 also comprises:
- a main transmission unit 3, which is adapted to transmit power from the turbines to a mast 4 driving the main rotor; and
- a plurality of secondary transmission units 6, in themselves known and only schematically shown, which are adapted to transmit power from the main transmission unit 3, i.e. assigned, for example, to provide the power necessary for the operation of respective on-board equipment or a drive shaft 5 of the tail rotor.

The helicopter 1 further comprises:
- a heat exchanger 10 for cooling the lubricating fluid, oil in the case shown, circulating inside the transmission unit 3; and
- a fan 11 (only schematically shown in FIG. 1) adapted to create an air circulation through the heat exchanger 10.

In the case shown, the heat exchanger 10 is a gas-liquid heat exchanger, in particular an air-oil one.

In other words, the heat exchanger 10 implements heat exchange between a flow of oil that is cooled and a flow of air that is heated.

In the accompanying figures, the flows of oil to be cooled and the air heated following the heat exchange with the oil are indicated by respective grey arrows.

Contrariwise, the flows of oil cooled after heat exchange with the air and cold air are indicated by respective white arrows.

The heat exchanger 10 basically comprises:
- an oil feed circuit 20; and
- an air feed circuit 30.

The circuit 20, in turn, comprises:
- an inlet 21 for the oil to be cooled;
- an outlet 22 for the cooled oil; and
- a plurality of oil feed modules 23 (FIGS. 2, 3 and 5), which ae fluidically connected to the inlet 21 and the outlet 22.

The circuit 30, in turn, comprises:
- an inlet 31 for the air still to be heated, fluidically connected to the fan 9;
- an outlet 32 for the heated air, fluidically connected to the fan 9; and
- a plurality of air feed modules 33 (FIGS. 2 to 4), which are fluidically connected to the inlet 31 and the outlet 32.

Figure 2:
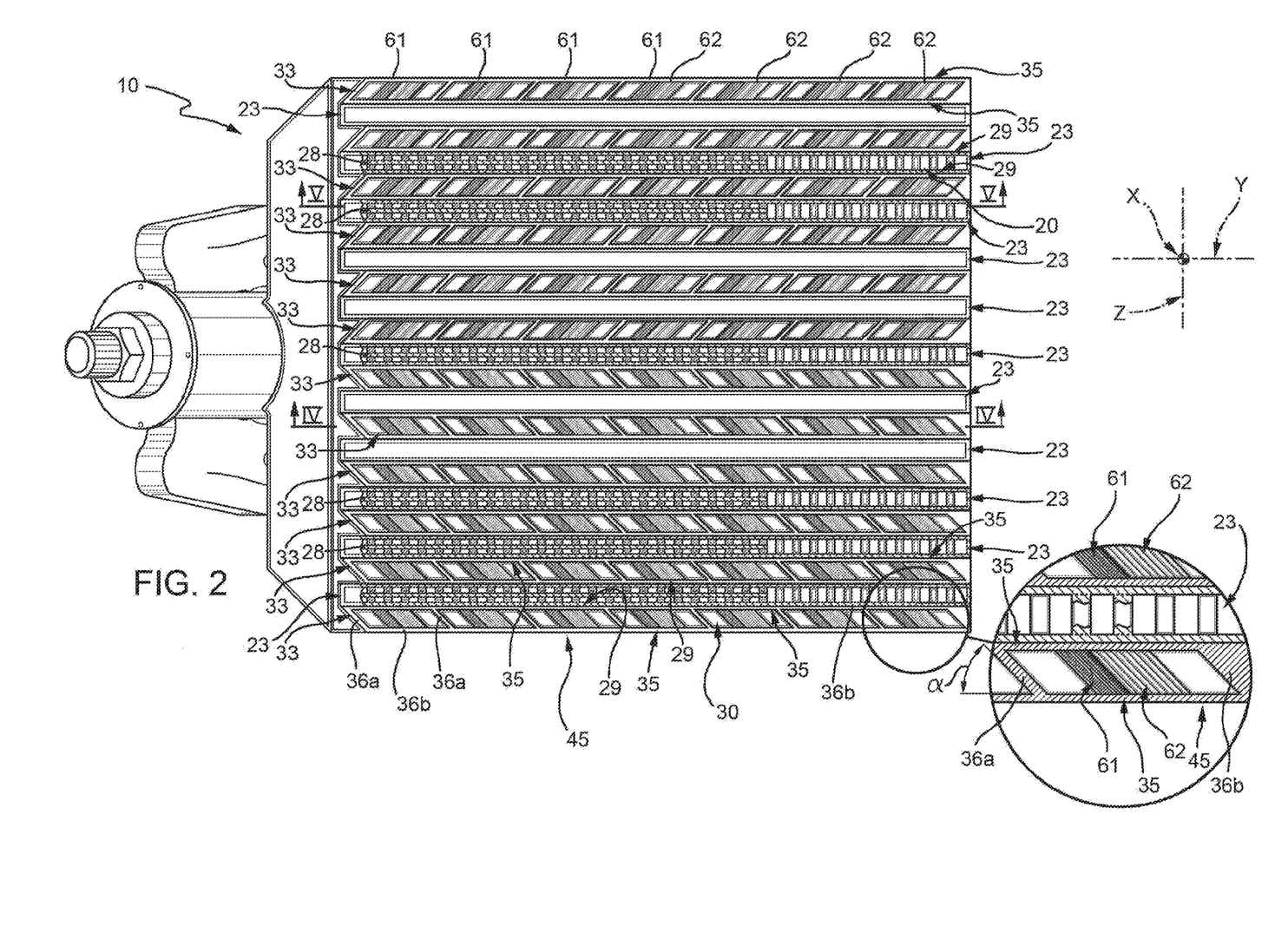
FIG. 2 is a front view, on a highly enlarged scale, of the heat exchanger of FIG. 1, with parts removed for clarity.
Figure 3:
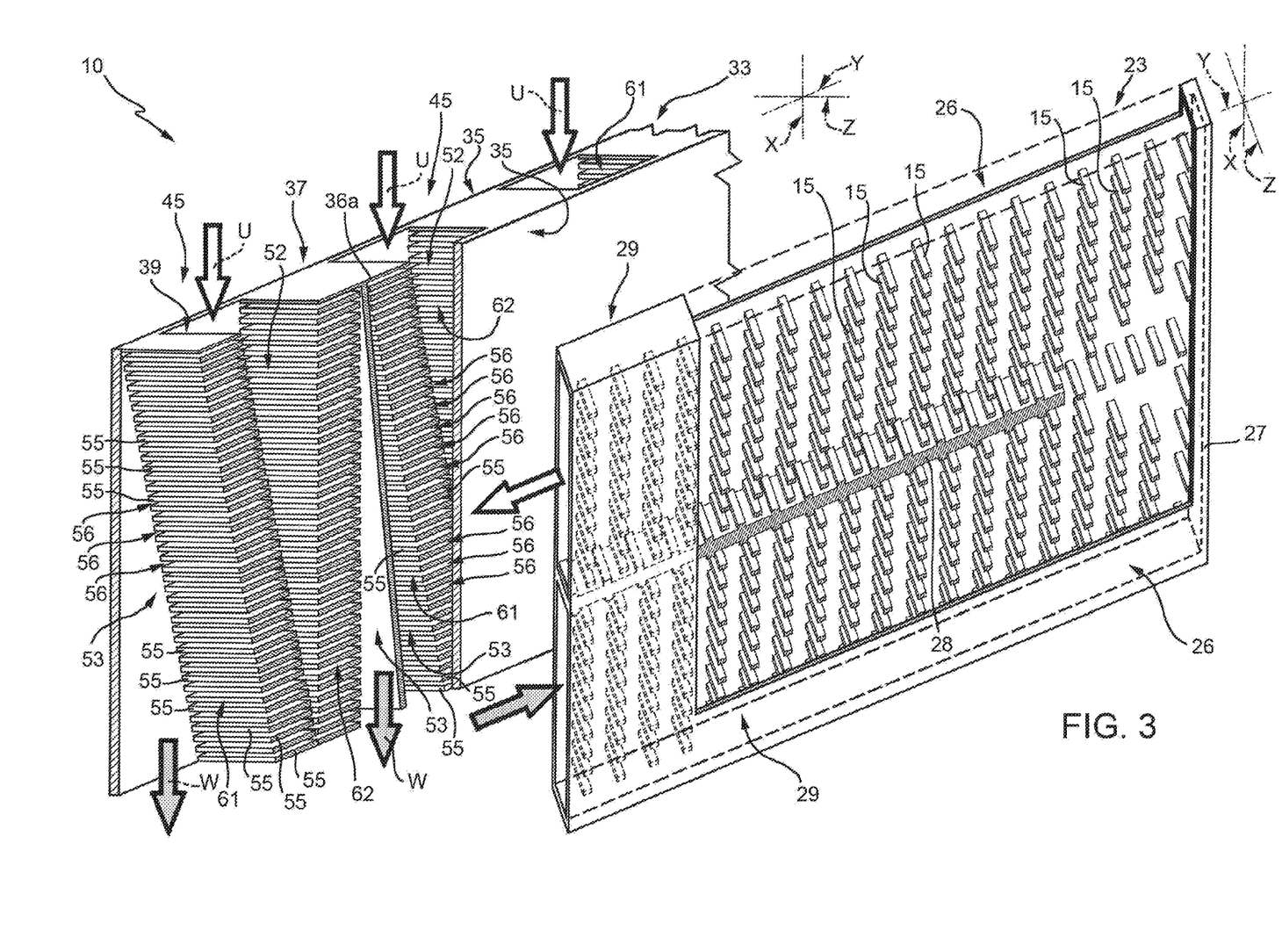
FIG. 3 is an exploded perspective view of the heat exchanger of FIGS. 1 and 2, with parts removed for clarity.

Referring to FIGS. 2 and 3, modules 23 and 33 alternate with one another along a direction Z and are elongated along a direction Y orthogonal to direction Z.

Figure 5:
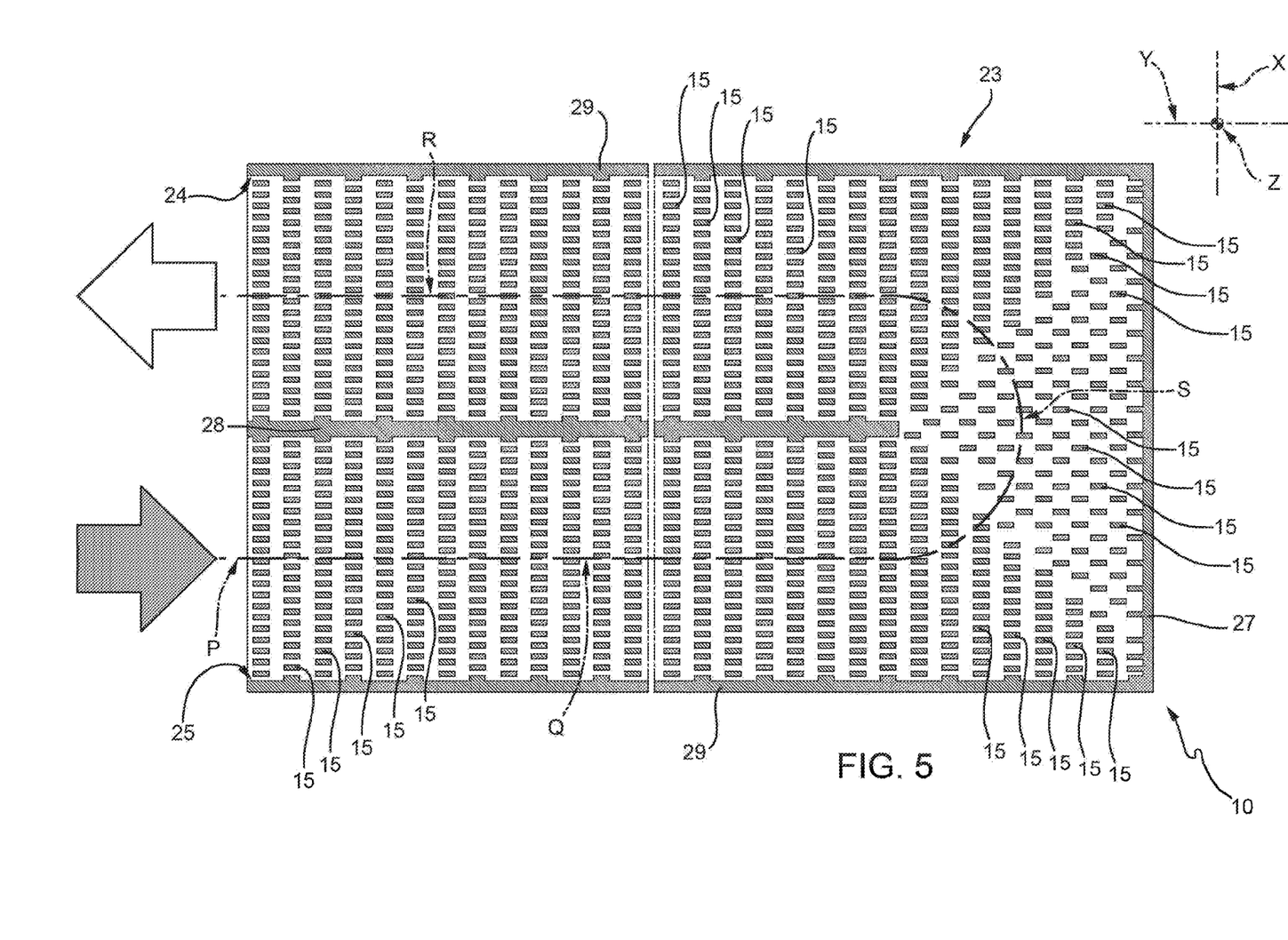
FIG. 5 is a section view along line V-V of FIG. 2.

The oil flows inside each module 23 along a respective U-shaped path P formed by a pair of deliver and return sections Q and R both parallel to direction Y (FIG. 5).

Each path P further comprises a section S interposed between sections Q and R.

Referring to FIGS. 3 and 5, each module 23 comprises an inlet section 24 fluidically connected to inlet 21 and an outlet section 25 fluidically connected to outlet 22.

Each module 23 comprises:
- a pair of parallel walls 26 opposite to each other along direction X, and lying on respective planes orthogonal to direction X;
- a wall 27 interposed between walls 26, opposite to sections 24 and 25 along direction Y, and lying on a plane orthogonal to direction Y;
- a separator 28 orthogonal to wall 27, extending from sections 24 and 25 towards wall 27 along direction Y and set apart from wall 27; and
- a pair of walls 29, extending between walls 26, and between wall 27 and sections 24 and 25.

In particular, walls 29 are opposite to each other and orthogonal to direction Z.

The separator 28 is also parallel to walls 26.

Each module 23 further comprises a plurality of fins 15 elongated along direction Z and extending between walls 29.

The separator 28, walls 29 and the portion of wall 26 delimiting section 24 of each module 23 delimit the delivery branch Q of the path P of the oil inside the module 23.

The separator 28, walls 29 and the portion of wall 26 delimiting section 25 of each module 23 delimit the return branch R of the path P of the oil inside the module 23.

The separator 28, wall 27, walls 29 and the portions of walls 26 immediately adjacent to wall 27 delimit the curved branch S of the path P.

The fins 15 are arranged with lower density in section S with respect to branches Q and R, in order not to obstruct the curved path of the oil inside the associated module 23.

The inlet 31 and the outlet 32 of circuit 30 are opposite to each other along direction X.

Figure 4:
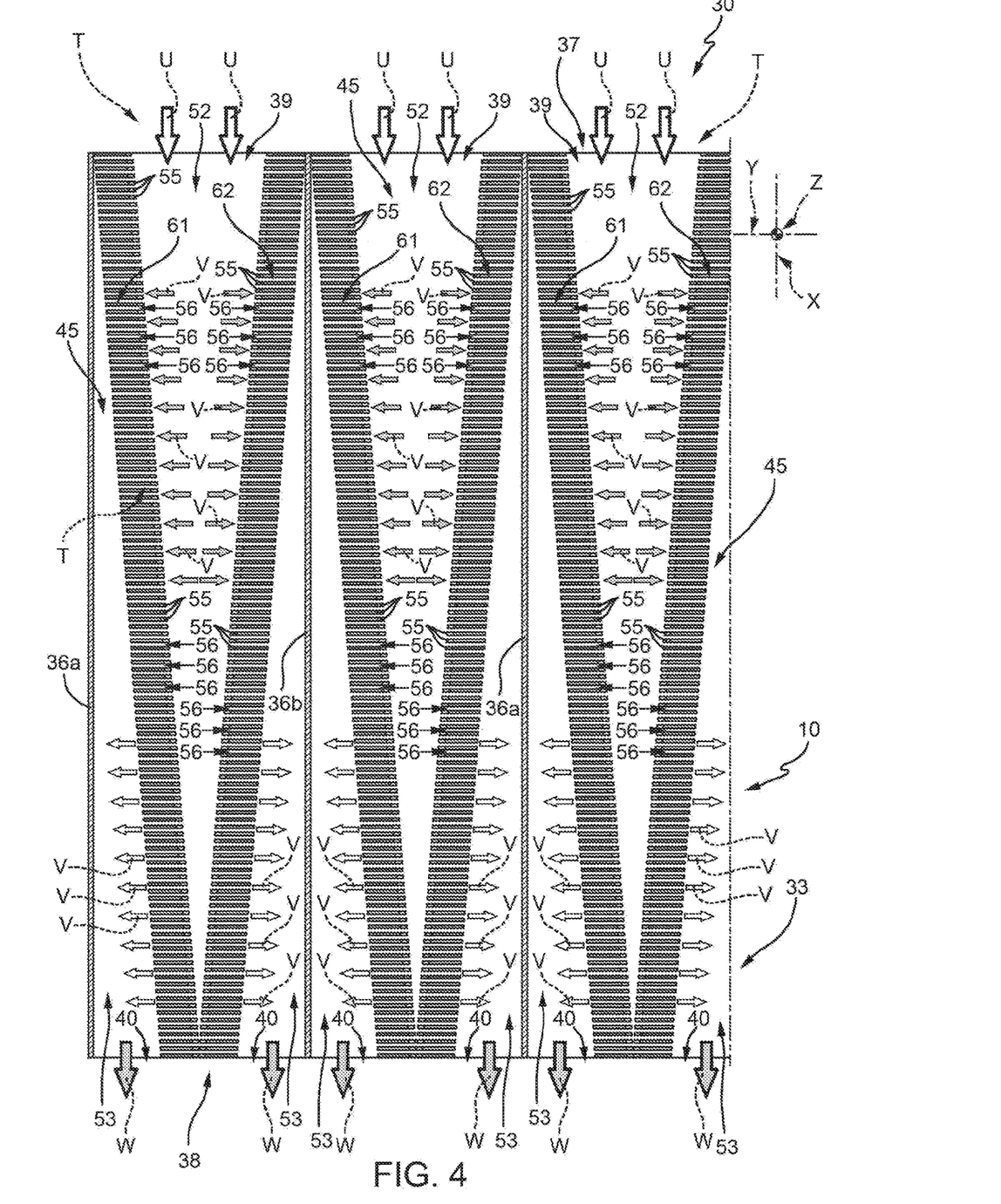
FIG. 4 is a section view along line IV-IV of FIG. 2.

Referring to FIGS. 2 to 4, each module 33 comprises:
- a pair of parallel walls 35, opposite to each other along direction Z, lying on respective planes orthogonal to direction Z and thermally coupled to respective walls 29 of mutually immediately adjacent modules 23 along direction Z;
- a plurality of walls 36a and 36b extending between walls 35 and extending along direction X; and
- a pair of mutually opposite and parallel walls 37 and 38 lying on respective planes orthogonal to direction X, and defining a plurality of respective air inlets and outlets 39 and 40 spaced out along direction Y.

In particular, the walls 29 and 35 of respective modules 23 and 33 that are mutually consecutive along direction Z are superimposed on each other.

Each module 33 defines a plurality of cells 45 placed side by side along direction Y and having an extension mainly along direction X.

Each cell 45 is delimited by:
- a pair of mutually parallel and opposite walls 36a and 36b, along direction X;
- respective sections of a pair of walls 35, along direction Z; and
- respective sections of walls 37 and 38 extending between the respective walls 36a and 36b.

Each cell 45 also comprises:
- one of the inlets 39 defined by the respective section of wall 37; and
- a pair of air outlets 40 defined by the respective sections of wall 38.

The inlets 39 and outlets 40 of each cell 45 are fluidically connected to the inlet 31 and the outlet 32, respectively, of circuit 30.

Module 33 also comprises a plurality of fins 55 interposed between walls 36 and adapted to aid heat exchange between the air that flows in each module 33 and the oil that flows in modules 23 immediately adjacent to modules 33.

Advantageously, each cell 45 comprises a row 61 of fins 55, which lie on respective planes orthogonal to direction X; the fins 55 of the row 61 extend at a progressively increasing distances from wall 36a along direction Y, when proceeding along direction X from the respective inlet 39 towards the respective outlets 40.

Each cell 45 also comprises a row 62 of further fins 55, which extend at progressively increasing distances from wall 36b along direction Y, when proceeding along direction X from the respective inlet 39 towards the respective outlets 40.

The rows 61 and 62 of fins 55 of each cell 45 converge towards one another when proceeding from the respective inlet 39 towards the respective outlets 40, parallel to direction X.

Each cell 45 defines:
a chamber 52 delimited by the associated inlet 39 and the associated rows 6L 62; and
a pair of chambers 53, each delimited by an associated wall 36a, an associated row 61 or 62, and an associated section 51.

The fins 55 of each cell 45 extend along direction Z between the associated walls 35.

The fins 55 of each cell 45 have a thickness along direction X and a length along direction Y.

In particular, mutually consecutive fins 55 of each cell 45 are spaced out along direction X by respective air passages 56.

Mutually consecutive fins 55 along direction X of the same row 61 and 62 partially overlap each other along direction Y.

The passages 56 place chamber 52 and chambers 53 in fluidic communication.

Each passage 56 extends along direction Y, is open at its opposite end with reference to direction Y, and is closed along directions X and Z.

Due to this configuration, the air flows inside each module 33 along a path T comprising (FIG. 4):
a section U substantially parallel to direction X and described, starting from inlet 39, inside the chamber 52;
a section V substantially parallel to direction Y and described inside the passages 56;
a section W substantially parallel to direction X and described starting from inside chambers 53 to the respective outlets 40.

The sum of the areas of the sections orthogonal to direction Y of the passages 56 is greater than the area of the inlet 39 of each cell 45.

In consequence, the air is slowed down as it flows from chambers 52 to the passages 56 and laps fins 55 along section V of the respective path T.

The area of each outlet 40 is less than the area of the associated inlet 39.

In the case shown, the perimeter of each cell 45 in section orthogonal to direction X is rhomboidal.

In particular, the walls 35 and walls 36a and 36b delimiting each cell 45 form between them an acute angle α of less than 45 degrees (FIG. 2).

Furthermore, the heat exchanger 10 is made in a single piece.

In particular, the heat exchanger 10 is made of aluminium.

In the case shown, the heat exchanger 10 is made using an additive manufacturing technology.

In particular, the printing direction of the heat exchanger 10 is parallel to direction Y.

In use, operation of the transmission unit 3 causes overheating of the lubricating oil it contains.

The heat exchanger 10 performs heat exchange between an air current and the lubricating oil, enabling the latter to cool.

In greater detail, the oil enters the heat exchanger 10 through inlet 21, follows circuit 20 inside modules 23 and exits the heat exchanger 10 through outlet 22.

Inside each module 23, the oil flows from the associated section 24 along the branches Q, R and
S of the associated path P until it reaches the associated section 25 and, from here, returns through outlet 22.

Due to the presence of fins 15, the oil gives out heat to walls 29 while it flows inside modules 23.

At the same time, following operation of the fan 11, the still cold air enters the heat exchanger 10 through inlet 31, follows circuit 30 inside modules 33 and leaves the heat exchanger 10 in a heated state through outlet 32.

Inside each module 33, the air flows inside the associated cells 45 between the respective inlet 39 and respective outlets 40 along the respective path T.

Furthermore, the air laps the fins 55 of the rows 61 and 62 of each module 33.

These fins 55 extend from the associated wall 29 and are therefore heated by the oil that flows in the modules 23 adjacent to each module 33.

In other words, heat is given up by the oil in each module 23 to fins 15 and to wall 29, from the latter to fins 55, and from fins 55 to the air that flows in modules 33 adjacent to the aforementioned module 23.

In greater detail, the still cold air flows inside each module 33, first inside the chamber 52 along section U of the associated path T with a main velocity component substantially parallel to direction X.

Then, the air is diverted and flows in the passages 56 between fins 55 along section V of the associated path T with a main velocity component substantially parallel to direction Y.

In this situation, the air is slowed down, thus increasing the efficiency of the heat exchange with the fins 55.

Finally, the air is again diverted and flows in chambers 53 of each module 33 along section W of the associated path T with a main velocity component substantially parallel to a direction X, until it exits the module 23 through sections 52.

The heated air then flows from sections 51 to outlet 32.

From examination of the heat exchanger 10 and the cooling method implemented according to the present invention, the advantages that can be achieved therewith are evident.

In particular, the fins 55 of rows 61 and 62 lie on respective planes orthogonal to direction X and extend at progressively increasing distances from the respective walls 36a and 36b along direction Y, when proceeding along direction X from the associated inlet 39 to the associated outlets 40.

In consequence, the trajectory of each particle of air that flows from inlet 39 to one of the outlets 40 passes through a single passage 56 and laps a single fin 55.

It follows that the air is substantially always at a temperature lower than the temperature of the fins 55 that it laps against, as opposed to what happens in the previously described known solutions.

This results in a further improvement in heat exchange efficiency between oil and air with respect to the known solutions described in the introduction of this description, for the same weight of the heat exchanger 10 and air pressure drop between inlet 31 and outlet 32.

Furthermore, the sum of the areas of the sections orthogonal to direction Y of the passages 56 is greater than the areas of the inlet 39 of each cell 45.

In consequence, the air undergoes not only a diversion, but also a slowing down when it laps fins 55.

This causes a further improvement in heat exchange efficiency between oil and water with respect to the known solutions described in the introduction of this description, for the same weight of the heat exchanger 10 and air pressure drop between inlet 31 and outlet 32.

Finally, the cells 45 do not have undercuts, making the heat exchanger 10 adapted for manufacturing in a single piece using the technology known as additive manufacturing. This technology is particularly flexible regarding the possibility of making fins 55 of different shapes.

Finally, it is clear that modifications and variants can be made regarding the heat exchanger 10 and the cooling method described and illustrated herein without departing from the scope defined by the claims.

In particular, each cell 45 could comprise just one of the rows 61 and 62 of fins 55.

The module 33 could be formed by a single cell 45 instead of a plurality of cells 45.

The transmission unit 3 could be one of transmission units 6.

The heat exchanger 10 could be applied to types of aircraft other than the helicopter 1, for example, a convertiplane or an aeroplane.

The invention claimed is:

1. A helicopter (1), comprising:
    a power unit;
    a rotor;
    a transmission unit (3) operationally interposed between said power unit and said rotor;
    a lubrication circuit of said transmission unit (3); and
    a heat exchanger (10) connected to said lubrication circuit;
said heat exchanger (10), comprising:
    a first module (23) defining a first feed path (P) for a first fluid to be cooled;
    a second module (33) defining a second feed path (T) for a second, cooling fluid; said first and second feed paths (P, T) being, in use, thermally coupled to each other;
each said second module (33) comprising at least one cell (45) formed by:
    an inlet (39) for a second, cooling fluid;
    at least one outlet (40) for said second cooling fluid, which is arranged on the opposite side to said inlet (39) along a first direction (X);
    at least one first wall (35) thermally coupled to said first path (P);
    a pair of second walls (36a, 36b) transversal to said at least one first wall (35);
    a plurality of fins (55) projecting in a cantilever fashion from said at least one first wall (35) and adapted to increase, in use, the heat exchange between said second cooling fluid and said at least one first wall (35); and
    at least one first row (61) of said fins (55), which extends longitudinally within a plane that is orthogonal to said first direction (X);
said fins (55) of said at least one first row (61) extending at progressively increasing distances from one of said pair of second walls (36a, 36b) along a second direction (Y) orthogonal to said first direction (X), when proceeding along said first direction (X) from said inlet (39) to said at least one outlet (40);
characterized in that said at least one cell (45) comprises at least one second row (62) of said fins (55);
said fins (55) of said at least one second row (62) extending at progressively increasing distances from another of said pair of second walls (36a, 36b) along said second direction (Y) and wherein each fin of said at least one first row (61) of said fins (55) is disposed parallel to a respective fin of said at least one second row (62) of said fins (55),
wherein said at least one first row (61) and said at least one second row (62) of each cell (45) continuously converge towards one another along said first direction X when proceeding from said respective inlet (39) toward said respective at least one outlet (40).

2. The heat exchanger according to claim 1, characterized in that said fins (55) are spaced out along said first direction (X) and form a plurality of passages (56) extending along said second direction (Y).

3. The heat exchanger according to claim 1, characterized in that mutually consecutive said fins (55) of said at least one first row (61) along said first direction (X) partially overlap along said second direction (Y).

4. The heat exchanger according to claim 2, characterized in that the sum of the area of the sections of said passages (56) orthogonal to said second direction (Y) is greater than the area of said inlet (39).

5. The heat exchanger according to claim 1, characterized in that said cell (45) comprises at least two said outlets (40);
    said at least one first row (61) and said at least one second row (62) delimiting between them a first chamber (52) delimited by said inlet (39);
    said one of said pair of second walls (36a, 36b) and said at least one first row (61) defining a second chamber (53) delimited by one of said outlets (40);
    said other of said pair of second walls (36a, 36b) and said at least one second row (62) defining a third chamber (53) delimited by the other of said outlets (40);
    said first chamber and said second chamber (52, 53) being in fluidic communication with each other via first said passages (56) defined between respective mutually consecutive first fins (55) of said at least one first row (61);
    said first chamber and said third chamber (52, 53) being in fluidic communication with each other via second said passages (56) defined between respective mutually consecutive first fins (55) of said at least one second row (62).

6. The heat exchanger according to claim 5, characterized in that said at least one first row (61) and said at least one second row (62) of said at least one cell (45) are mutually convergent, when proceeding from said inlet (39) towards said outlets (40).

7. The heat exchanger according to claim 1, characterized in that said second module (33) comprises a plurality of said cells (45) placed side by side along said second direction (Y).

8. The heat exchanger according to claim 1, characterized in that said at least one cell (45) has a rhomboidal perimeter in section orthogonal to said first direction (X).

9. The heat exchanger according to claim 8, characterized in that said first wall (35) and one of said second walls (36a, 36b) form an acute angle (a) of less than 45 degrees.

10. The heat exchanger according to claim 1, characterized in that said heat exchanger is made in a single piece.

11. The heat exchanger according to claim 1, characterized in that it is made using an additive manufacturing technology.

12. The heat exchanger according to claim 1, characterized in that said first fluid is a liquid, in particular oil, and said second fluid is a gas, in particular air.

13. A method of cooling a first fluid to be cooled by means of heat exchange with a second cooling fluid for an aircraft (1), comprising the steps of:
- i) feeding said first fluid to be cooled along a first path (P);
- ii) feeding said second cooling fluid along a second path (T) thermally coupled to said first path (P);
- said second path (T) comprising at least one inlet (39) and at least one outlet (40) arranged at opposite ends to each other along a first direction (X), and being delimited by at least one wall (35) thermally coupled to said first path (P) and by a pair of second walls (36a, 36b) transversal to said at least one first wall (35);
- said step ii) comprising the steps of:
- iii) feeding said second cooling fluid through said at least one inlet (39) with a main component of motion parallel to said first direction (X);
- iv) lapping a plurality of fins (55) projecting in a cantilever fashion from said at least one first wall (35) with said second cooling fluid;
- v) feeding said second cooling fluid through said at least one outlet (40) with a main component of motion parallel to said first direction (X);
- characterized in that it comprises the step of:
- vi) feeding said second cooling fluid along said second direction (Y) and through a plurality of passages (56) defined between said mutually consecutive fins (55) of a first row (61) and mutually consecutive fins (55) of a second row (62); and
- vii) slowing said second fluid during said step vi) and at the end of said step iii);
- said fins (55) of said first row (61) extending at progressively increasing distances from one of said pair of second walls (36a, 36b) along a second direction (Y) orthogonal to said first direction (X), when proceeding along said first direction (X) from said at least one inlet (39) to said at least one outlet (40); said fins (55) of said second row (62) extending at progressively increasing distances from another of said pair of second walls (36a, 36b) along said second direction (Y);
- said fins (55) of said first row (61) and second row (62) extend longitudinally within a plane that is orthogonal to said first direction (X) and wherein each fin of said at least one first row (61) of said fins (55) is disposed parallel to a respective fin of said at least one second row (62) of said fins (55), wherein said at least one first row (61) and said at least one second row (62) of each cell (45) continuously converge towards one another along said first direction X when proceeding from said respective inlet (39) toward said respective at least one outlet (40).

* * * * *